Patented Jan. 15, 1929.

1,698,713

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR CONTROLLING THE VULCANIZATION OF RUBBER AND SIMILAR MATERIALS AND PRODUCTS OBTAINED THEREBY.

No Drawing. Original application filed June 25, 1923, Serial No. 647,757. Divided and this application filed November 1, 1927. Serial No. 230,388.

This invention relates to processes for controlling the vulcanization of rubber and similar materials such as balata, gutta percha and synthetic rubber, and products obtained thereby. It is more particularly directed to processes for checking such vulcanization of rubber or the like combined with a vulcanizing agent, a material containing carbon disulphide, zinc or equivalent metal in combination and an amine or any one or more of such substances, and causing vulcanization thereafter if desired; and to products obtained thereby.

The principal object of the present invention is to provide a process for checking the vulcanization of rubber which shall be simple and efficient, particularly in causing sure curbing or checking of vulcanization of rubber in any form including latex, cements or solid rubber whether applied to untreated rubber before vulcanization, to rubber containing one or more vulcanizing or other ingredients, or to rubber which has been partially or completely vulcanized while permitting easy resumption of vulcanization, at normal temperature 70° F. or above, say 212° F., or 240-286° F. later if desired. Another object of the invention is to provide a series of products resulting from such processes in which such control has been exercised and which therefore may be more readily manipulated in factory processes without danger of prevulcanization and which will result in rubber articles having improved physical characteristics such as better resistance to ageing.

The invention accordingly comprises a process for controlling the vulcanization of rubber which includes causing a vulcanizing ingredient contained in rubber to react with a substance for checking the vulcanizing function of the ingredient and at will treating the rubber with an agent causing vulcanization, and the products obtained thereby.

The term "agent" as herein employed is intended to include both chemical substances and physical forces such as heat.

The term "vulcanizing ingredient" as employed herein is intended to include a substance which is a component part of any combination or mixture which is capable of vulcanizing rubber.

In accordance with copending application No. 574,780 filed July 13, 1922, continued in applications Nos. 41,875, filed July 6, 1925, 681,066, filed Dec. 17, 1923, and copending application No. 574,797, filed July 13, 1922, now Patent No. 1,463,794, it has been shown that vulcanization at ordinary temperatures, approximately 70° F., occurs when four ingredients, M in combination, an amine, a material comprising sulphur and a material comprising carbon disulphide or carbon oxysulphide are present. (Above the ordinary temperature, say ranging upwards to 212° F. or 240-286° F. vulcanization in the presence of these substances occurs at an increased rate.) M represents zinc or mercury in the mercuric state when vulcanization at ordinary temperatures, approximately 70° F., is carried out, and when vulcanization above ordinary temperatures, the preferred metals are the following:—zinc, mercury, preferably in the mercuric state, cadmium, copper, preferably in the cupric state, arsenic, preferably in the arsenous state, manganese, preferably in the manganous state, and lead, preferably in the plumbous state. It has been found in accordance with the present invention that the vulcanization accomplished by the presence of these ingredients may be controlled by controlling the vulcanization function of any one of the ingredients by treating it, preferably in rubber, with a substance which reacts chemically therewith, preferably without removing the reaction product where solid rubber is employed although it may be removed later if desired, and that after such treatment to check the function, the vulcanization may be carried on in the presence of the other ingredients by the application of heat or by replacing the ingredient which was reacted upon the same or another quantity of the same ingredient or another similar ingredient. The control of vulcanization in the manner constituting the present invention is particularly important in its action to prevent the premature vulcanization of rubber compounds containing accelerators and other vulcanizing ingredients which vulcanize at ordinary temperatures or slightly above. Taking the process of vulcanization set forth in Cadwell's copending application, Sr. No. 441,691, filed February 1, 1921, in which rubber, zinc oxide, sulphur and oxy normal butyl thiocarbonic acid disulphide are combined and the compound so formed subsequently exposed to the vapors of aniline, constituting the fourth, i. e. amine ingredient, to effect vulcanization, if this compound without exposure to aniline or other amine be allowed to stand for a period of time at ordinary temperatures vulcanization is apt to occur, due it is believed to the action of the natural amine occurring in the rubber or to casual amine such as aniline picked up from the atmosphere of the factory, either of which may furnish the fourth ingredient required for vulcanization at ordinary temperature. The premature vulcanization mentioned occurs for instance in scrap rubber, that is pieces of rubber—usually small pieces—resulting from cutting or other processes for the manufacture of various rubber articles. By the present invention such premature vulcanization is avoided. If the premature vulcanization mentioned occurs it causes a serious loss of money in factory operations. Furthermore if vulcanized rubber is treated by the present process to check further vulcanization of the rubber, it has been found that further vulcanization substantially does not occur and thereby the ageing properties of the rubber are greatly improved. In addition it has been found that the process may be applied to various types of raw rubber to produce a uniformity of vulcanization therein, for example various lots of smoked sheet vulcanize it has been found at varying speeds. By the application of the present process these varying speeds may be changed to a uniform speed. The uniformity of speed of vulcanization is important in that vulcanized articles having a uniform degree of vulcanization may be automatically secured.

Instead of causing reaction with natural or casual amine to occur in a compound containing rubber, zinc in combination, sulphur and oxy normal butyl thiocarbonic acid disulphide, either zinc in combination of the carbon disulphide-containing material for example oxy normal butyl thiocarbonic acid disulphide may be treated with a suitable substance to check its vulcanizing function. Upon suitable treatment thereafter vulcanization may be accomplished.

In general in treating rubber containing vulcanizing ingredients, the following procedures may be employed:

1. For controlling the vulcanization by influencing the action of an amine or other basic nitrogenous matter constituting one of the four ingredients mentioned above, the amine may be rendered partially or totally inactive by treating it with an aldehyde of the aliphatic or aromatic series, such as formaldehyde, benzaldehyde, acetaldehyde, etc., or may be treated with an acid anhydride such as phthalic anhydride, or with nitroso bodies such as para nitrosodimethylaniline, nitroso beta naphthol, para nitrosodimethylaniline, or quinone, or similar materials and other bodies having similar properties. These substances lower the basicity of the amine or other basic nitrogenous matter present. Where the amine or other basic nitrogenous matter is not one of the four ingredients but is used for example with zinc in combination and sulphur, the treatment with aldehyde actually increases the activity of the amine. But treatment with an anhydride such as phthalic anhydride or nitroso bodies or quinone or other bodies having similar properties checks the vulcanizing function of the amine.

2. For controlling the vulcanization by influencing the action of the carbon disulphide-containing material, an excess of either an aliphatic amine or amonia or hydrogen sulphide may be employed. The amine employed should be a primary amine.

3. For controlling the vulcanization by influencing the action of the zinc or similar metal, hydrogen sulphide may be employed or similar substance to form a less active compound. The zinc sulphide formed when hydrogen sulphide is used is a less active form of zinc in combination.

4. For controlling vulcanization by influencing the action of sulphur where sulphur constitutes one of the four ingredients mentioned above various unsaturated bodies may be employed such as palm oil, rosin and pine tar.

The substances for controlling the vulcanizing functions of these various vulcanizing ingredients leave the rubber substantially unchanged physically. The rubber may be employed in various states such as latex, raw rubber, or products intermediate between latex and raw rubber, such as rubber sponge, as set forth in United States patents of Ernest Hopkinson, 1,423,525 and 1,423,526; rubber which has been compounded and is ready for vulcanization and partially or fully vulcanized rubber. The treatment with the various materials mentioned above may be accomplished in various ways, such as by mixing mechanically with the rubber either by milling or similar process, or by stirring in latex or cement. Or the various substances either in the gaseous, liquid or solid state may be absorbed by latex, raw rubber, rubber sponge, cements or vulcanized or vulcanizing rubber.

This application is a division of my copending application Serial No. 647,757, filed June 25, 1923, and relates particularly to checking the vulcanization in cements.

As one illustration of the invention, the following is given:

Cement consisting of 100 parts of rubber, 2 parts of zinc oxide, 2 parts of sulphur and 2 parts of oxy normal butyl thiocarbonic acid disulphide, 0.3 part of phthalic anhydride and 800 parts of benzol will not vulcanize prematurely due to the fact that the phthalic anhydride checks the functioning of any naturally occurring or casual amine. Forms may be dipped in this cement and thereafter vulcanized if desired by treatment with amine. The forms may be exposed to aniline or diethylamine vapors for 12-14 hrs. at 140° F., or they may be immersed in a saturated aqueous solution of aniline for about the same length of time and subsequently maintained in water at 212° F., or in air for 1 hr. Vulcanization may also be accomplished by heating the rubber at 266° F. for an hour.

100 parts of rubber, 10 parts of zinc oxide, 6 parts of zinc butyl xanthogenate, 0.3 part of phthalic anhydride are mixed on the rolls in the usual manner and treated with 800 parts of benzol to form a cement. The naturally occurring or casual amine in the rubber ordinarily tends to decompose the zinc butylxanthogenate. The phthalic anhydride neutralizes such amine and thus prevents decomposition of the zinc butylxanthogenate. This cement may be vulcanized by mixing it with an equal part of cement made up to 100 parts of rubber, 6 parts of sulphur, 3 parts of dibenzylamine and 800 parts of benzol.

The phthalic anhydride preserves zinc dithiobenzoate in the same way.

Instead of phthalic anhydride, aldehydes such as benzaldehyde or acetaldehyde or formaldehyde may be employed, or nitroso compounds such as para nitroso dimethyl aniline or similar materials may be utilized to check the vulcanizing function of the amine in the cement.

The vulcanizing action of the sulphur may likewise be checked. A benzol cement is made up to a stock containing 100 parts of rubber, 2 of zinc oxide, 3 of oxy normal butyl thiocarbonic acid disulphide, 2 of sulphur and 5 of palm oil. This cement may be stored or manipulated as desired. The palm oil is an unsaturated compound which checks the vulcanizing action of the sulphur. Vulcanization may be resumed by treating the cement, or an article formed therefrom with amine, either in vapor form or in any of the ways described above. The vulcanizing action of the metal in combination may be checked by introducing ammonium sulphide or hydrogen sulphide into the cement. Vulcanization may be resumed by adding more metallic oxide and then vulcanizing in the usual way as described above.

The vulcanizing action of the carbon disulphide material may be checked by introducing ammonia into the cement. The carbon disulphide material for example oxy normal butyl thiocarbonic acid disulphide is decomposed without causing vulcanization of the rubber. Further quantity of the carbon disulphide material may be added when it is desired to have vulcanization take place.

Instead of oxy normal butyl thiocarbonic acid disulphide mentioned in any of the above examples, the following vulcanizing ingredients may be substituted to be treated by the processes before mentioned herein: Zinc butyl xanthogenate, thiobenzoylmonosulphide, oxy ethylthiocarbonic acid disulphide and zinc dithiobenzoate in compounds or cements. The proportion of each of these materials preferably employed is as follows: 100 parts of rubber, 10 parts of zinc oxide, 3 parts of sulphur and from 0.1 to 3 parts of zinc butyl xanthogenate, thiobenzoylmonosulphide, oxy ethylthiocarbonic acid disulphide or zinc dithiobenzoate.

It will be observed that oxy normal butyl thiocarbonic acid disulphide, zinc dithiobenzoate, zinc butyl xanthogenate, thiobenzoylmonosulphide, oxy ethylthiocarbonic acid disulphide are representatives of a large class of materials whose action may be controlled in a manner similar to that above set forth. This class of materials includes thiol salts, disulphides and monosulphides some of which are set forth in my Patents 1,440,963, 1,440,964, 1,440,961, and my copending applications Sr. Nos. 548,828, 548,829, 548,831, now issued as U. S. Patents 1,532,226, 1,532,227 and 1,510,652, respectively. In the patents herein mentioned and in general where it is desired to control the vulcanization of rubber by chemically treating vulcanizing ingredients or particularly where it is desired to control the vulcanization of rubber containing sulphur and amine, zinc or equivalent metal, carbon disulphide or materials containing the group $$\overset{CS}{\underset{X}{\|}}$$

where X represents sulphur or a substitute element or group the processes herein set forth may be employed.

The processes herein set forth are simple and efficient. They cause either partial or complete stoppage of vulcanization when applied to the various types of rubber employed containing one or more vulcanizing ingredients. They permit easy resumption of vulcanization later, if desired. Furthermore a uniform rate of vulcanization may be established for different lots of raw rubbers such as smoked sheet by the processes described. The products resulting from the process may be manipulated without fear of premature vulcanization and as a result the difficulty of producing scrap rubber in factory operations which vulcanized before it could be reformed into articles and which represented accordingly a loss has been done away with. Products in which over-vulcanization has been prevented by the processes herein included have a correspondingly increased resistance to ageing.

Having thus described my invention what I claim and desire to protect by Letters Patent is:

1. A process for controlling the vulcanization of rubber which comprises preparing a cement consisting of rubber, zinc in combination, a sulphur-containing material, carbon disulphide-containing material and phthalic anhydride with benzol, and causing vulcanization by treating it with aniline in excess of that required to counteract the checking effect of phthalic anhydride.

2. A process for vulcanizing rubber which comprises preparing two complementary cements containing complementary vulcanizing ingredients, at least one of the cements containing an agent adapted to check the vulcanizing function of at least one of the ingredients, and bringing the two cements together to cause vulcanization.

3. A process for vulcanizing rubber which comprises preparing two complementary cements containing four complementary vulcanizing ingredients, namely, zinc in combination, a carbon disulphide-containing material, an amine, and a sulphur-containing material, at least one of the cements containing an agent adapted to check the vulcanizing function of at least one of the ingredients, and bringing the two cements together to cause vulcanization.

4. A process for vulcanizing rubber which comprises preparing two cements, one of which contains zinc butyl xanthogenate, zinc oxide, and phthalic anhydride, the other cement containing dibenzylamine and sulphur, bringing the cements together, and causing vulcanization to occur.

5. Vulcanized rubber derived from two complementary rubber-containing materials, one comprising rubber, zinc in combination, carbon disulphide-containing material and phthalic anhydride, the other zinc in combination, a material containing sulphur, an amine, and vulcanized.

6. Vulcanized rubber derived from two complementary cements containing four complementary vulcanizing ingredients, namely zinc in combination, carbon disulphide-containing material, an amine and a sulphur-containing material, at least one of the cements containing an agent to check the vulcanizing function of at least one of the ingredients.

Signed at New York, county and State of New York, this 26th day of October, 1927.

SIDNEY M. CADWELL.